3,374,114
PROCESS OF INSULATING AN ELECTRICAL
CONDUCTOR WITH A POLYESTER
Maria V. Wiener, Akron, Ohio, assignor to The Goodyear Tire & Rubber Company, Akron, Ohio, a corporation of Ohio
No Drawing. Filed Mar. 13, 1964, Ser. No. 351,863
1 Claim. (Cl. 117—232)

ABSTRACT OF THE DISCLOSURE

A polyester is formed by condensing 2,6- or 2,7- or 1,5 - naphthalene dicarboxylic acid and either terephthalic or isophthalic acid with a mixture of a glycol and glycerine or other polyol containing 3 to 6 carbon atoms. The condensation reaction is stopped before gelling occurs, and the product is applied to a substrate, in solution in an organic solvent, if desired. The coated product is then heated to cross link the polyester. The coating is suitable for electrical insulation.

---

This invention relates to a method of preparing and cross-linking a cross-linkable polyester. The polyester is particularly useful as a coating and the invention includes coated substrates which will withstand the temperatures encountered in applying and curing the polyester, such as metals, etc. The invention includes, more particularly, an electrical conductor coated with the polyester.

Precopio et al. 2,936,296 describes in general the method of producing insulation polyesters from terephthalic and isophthalic acids, ethylene glycol and polyols. (The term "polyol" is used herein to refer to an aliphatic alcohol which contains at least three hydroxyl groups.) We quote from that patent:

"When acids or derivatives of acids other than terephthalic acid or isophthalic acid are employed, or when glycols other than ethylene glycol are employed in the resins of the present invention, the resulting product is deficient in at least one of the several properties required for a high temperature insulating material." (Column 8, lines 31-36.)

Contrary to the teaching of that patent, if terephthalic or isophthalic acid is replaced wholly or in part by 2,6-, 2,7- or 1,5 - naphthalene dicarboxylic acid an improved insulating material is obtained. The preferred naphthalene dicarboxylic acid is 2,6 - naphthalene dicarboxylic acid. Such naphthalene dicarboxylic acids produce high-temperature resistant polyesters possessing a higher degree of aromaticity than the esters obtained with terephthalic and isophthalic acids, and improved insulating materials are obtained.

The polyesters of this invention comprise:

(1) Acid units which consist of 30 to 100 mol percent of 2,6-, 2,7-, or 1,5 - naphthalene dicarboxylic acid and 70 to 0 mol percent of an acid of the class consisting of terephthalic acid and isophthalic acid;

(2) Glycol units which form 35 to 85 mol percent of the alcohol portion of the polyester; and (3) Polyol units which form 15 to 65 mol percent of the alcohol portion of the polyester.

Usually, the glycol will be ethylene glycol. Other glycols can be used such as straight- or branched-chain glycols containing up to 6 carbon atoms, and symmetrical cyclic glycols containing 4 to 8 or more carbon atoms such as 1,4 - cyclobutane dimethanol, 1,4 - cyclohexane diethanol, and the preferred 1,4 - cyclohexane dimethanol, etc.

Glycerine is the polyol generally employed although other polyols containing 3 to 6 hydroxyl groups may be used such as 1,1,1 - trimethylol ethane, 1,1,1 - trimethylol propane, pentaerythritol, sorbitol, mannitol, etc.

The acid and alcohol components are reacted to produce a linear polymer and just before gelation the polyester is shaped, as by application to a conductor from a solution or a melt, or as a powder by "fluidized bed," "flame spray," "plasma jet spray," cyclone coating," "electrostatic powder spray," or any other procedure, with heating in the presence of a suitable agent to cross link or set it. Instead of any of the aforementioned acids, a lower alkyl ester thereof may be used. By "lower alkyl ester" we refer more particularly to a methyl or ethyl ester.

The esterification or alcoholysis and subsequent polymerization and cross-linking are usually catalyzed at elevated temperatures. Esterification or alcoholysis as well as polymerization catalysts useful in speeding up the reaction include hydrochloric acid, toluene sulfonic acid, and compounds of manganese, lead, zinc, cadmium, magnesium, tin, iron, titanium, etc. which are soluble in the reaction mixture. Cross-linking catalysts useful in speeding up the high-temperature curing of the polyester include compounds of zinc, manganese, cobalt, lead, cadmium, calcium, titanium, and other metals often used as octoates, naphthenates, linoleates, etc. and aliphatic and aromatic isocyanates, etc. Usually not over 5 percent of a catalyst (based on the weight of the polyester) will be used, although more may be employed, and with isocyanates more is usually required.

The polymerization is allowed to progress until the intrinsic viscosity of the reaction mixture is about 0.15 to 0.5, as measured in solution in a 60:40 mixture of phenol and sym.-tetrachloroethane, but it is always terminated before gelation commences. The reaction is stopped by reduction of the high vacuum to atmospheric pressure with an inert gas. The polyester thus formed is generally dissolved in a solvent for solution coating applications, such as cresylic acid, a mixture of cresols with a suitable aromatic petroleum fraction, etc. A solution with a solids content of 15 to 40 percent, by weight, is quite satisfactory. A cross-linking catalyst is added and the polyester is then applied to the insulator, as by dipping, spraying or brushing or by application in the absence of a solvent. The polyester may also be molded onto the substrate in a mold, but it is not usually practical to mold insulation. Relatively short heating to about 400° C. evaporates any low-boiling solvent used, and gives rapid curing.

The invention is illustrated by the following examples.

Example I

The following materials were charged to a standard glass-tube polymerization reactor equipped with a stirrer:

| | Grams |
|---|---|
| Dimethylterephthalate (0.07 mol) | 13.6 |
| Dimethyl ester of 2,6-naphthalene dicarboxylic acid (0.03 mol) | 7.3 |
| Ethylene glycol (0.23 mol) | 14.3 |
| Zinc acetate | 0.006 |

A slow stream of nitrogen was passed over the reaction mixture. It was heated at 217° C. bath temperature with removal of methanol until the alcoholysis was substantially complete. Then 3.2 grams (0.035 mol) glycerine were added to the reactor at 245° C. bath temperature; the pressure was slowly reduced within the next hour to 1.5 mm. Hg while excess of ethylene glycol distilled out. Within the next few minutes the reaction product attained the intrinsic viscosity of about 0.2.

A part of this reaction product was dissolved in organic solvents (cresylic acid and low-boiling aromatic petroleum solvent) to give a 20 percent solution. Zinc naphthenate was added in solution to give a concentration of 0.5 percent zinc based on the polyester weight. An electrical conductor was dipped into this solution and heated to 425° C. for one minute. The dipping and heating were repeated five times to build up a satisfactory insulation.

*Example II*

The procedure was the same as described for Example I, except that 7.8 grams (0.4 mol) of dimethyl terephthalate and 14.6 grams (0.6 mol) of dimethyl 2,6-naphthalate were used instead of the quantities used there, with ethylene glycol, zinc acetate, glycerine and zinc naphthenate in the quantities given there. The polyester had an intrinsic viscosity of 0.360 prior to cross linking.

*Example III*

The procedure was the same as described for Example I, except that 5.8 grams (0.3 mol) of dimethyl terephthalate and 17.1 grams (0.7 mol) dimethyl 2,6 - naphthalate were used, with the given quantities of ethylene glycol, zinc acetate, glycerine and zinc naphthenate. The polyester had an intrinsic viscosity of 0.398 prior to cross linking.

The cut-through temperatures of the three insulations were compared with that of a commercial insulation made by the procedure of Precopio et al. 2,936,296 or some improvement thereof, using the same method of application as in Example I. By a method quite similar to that described in Precopio et al. 2,936,296, the cut-through temperatures of the materials from Examples I to III were found to be in the range of 210° C. to 215° C. compared to a cut-through temperature of only 171° C. for the commercial material.

The invention is covered in the claim which follows. What I claim is:

1. The process of insulating an electrical conductor which consists of esterifying or ester-exchanging and polymerizing
    (a) 30 to 100 mol percent of a member of the class consisting of 2,6-, 2,7- and 1,5 - naphthalene dicarboxylic acids and lower alkyl esters thereof
    and 70 to 0 mol percent of a member of the class consisting of terephthalic and isophthalic acids and lower alkyl esters thereof with
    (b) 35 to 85 mol percent of a glycol from the class consisting of straight- and branched-chain glycols containing 2 to 6 carbon atoms and cyclic glycols containing 4 to 8 carbon atoms and 65 to 15 mol percent of glycerine,
stopping the reaction before gelling commences, the pre-gel polyester being soluble in cresylic acid, and applying the resulting polyester to the electrical conductor with a cross-linking catalyst and
cross-linking the polyester on the conductor by heating at substantially 425° C. for substantially one minute.

References Cited

UNITED STATES PATENTS

| | | | |
|---|---|---|---|
| 1,950,468 | 3/1934 | Zwilmeyer | 260—75 |
| 3,123,578 | 3/1964 | Hogsed | 260—75 |

WILLIAM H. SHORT, *Primary Examiner.*

R. T. LYON, *Assistant Examiner.*